(12) United States Patent
McKinley

(10) Patent No.: US 6,384,980 B1
(45) Date of Patent: May 7, 2002

(54) DEVICE FOR DISPLAYING LENTICULAR DISPLAYS

(76) Inventor: William R. McKinley, 69 Park Lane, Golf, IL (US) 60029

( * ) Notice: Subject to any disclaimer, the term of this patent is extended or adjusted under 35 U.S.C. 154(b) by 0 days.

(21) Appl. No.: 09/800,969

(22) Filed: Mar. 6, 2001

(51) Int. Cl.⁷ .......................... G02B 27/10; G03B 21/60
(52) U.S. Cl. ....................................... 359/619; 359/455
(58) Field of Search ................................ 359/619, 455, 359/456, 822, 621; 396/324

(56) References Cited

U.S. PATENT DOCUMENTS

| | | | |
|---|---|---|---|
| 3,852,787 A | * 12/1974 | Nims et al. ................ | 396/328 |
| 4,118,879 A | 10/1978 | Simon ......................... | 40/437 |
| 4,306,226 A | 12/1981 | Swarbrick .............. | 340/815.57 |
| 4,897,802 A | 1/1990 | Atkinson et al. ............. | 40/362 |
| 5,364,274 A | 11/1994 | Sekiguchi ................... | 434/365 |
| 5,424,553 A | * 6/1995 | Morton ....................... | 250/548 |
| 5,493,427 A | * 2/1996 | Nomura et al. ............... | 359/40 |
| 5,494,445 A | 2/1996 | Sekiguchi et al. .......... | 434/365 |
| 5,532,786 A | * 7/1996 | Hassall et al. ................ | 355/22 |
| 5,588,526 A | 12/1996 | Fantone et al. .......... | 206/308.1 |
| 5,710,666 A | 1/1998 | McDonald .................. | 359/463 |
| 5,757,545 A | 5/1998 | Wu et al. .................... | 359/463 |
| 5,850,913 A | 12/1998 | Fantone et al. .......... | 206/308.1 |
| 5,941,382 A | 8/1999 | Fantone et al. .......... | 206/308.1 |

* cited by examiner

*Primary Examiner*—Ricky Mack
(74) *Attorney, Agent, or Firm*—Lee, Mann, Smith, McWilliams, Sweeney & Ohlson

(57) ABSTRACT

The claimed invention provides a self-actuating lenticular display assembly that places the lenticular image in intimate contact with the lenticular lens while maintaining the lenticular image separate from the lenticular lens to form the lenticular display. The lenticular display assembly further comprises a rigid back plate placed behind the lenticular display so that the lenticular image moves in a parallel plane between the lenticular lens and the rigid back plate, a motor mounted to the back plate to accomplish movement of the lenticular image in relation to the lenticular lens, alignment mechanisms that allow the lenticular image to be incrementally adjusted in relation to the lenticular lens, and different means for maintaining intimacy between the lenticular image and the lenticular lens, thus eliminating undesirable "soft spots" that may occur.

18 Claims, 7 Drawing Sheets

DEVICE FOR DISPLAYING LENTICULAR DISPLAYS

BACKGROUND OF THE INVENTION

1. Field of the Invention

The present invention generally relates to a method and device for displaying signage systems. More specifically, the present invention relat displaying lenticular images.

2. Description of the Prior Art

A lenticular lens as used in this field is a sheet of transparent material having one side composed of a contiguous array of cylindrical lenses known as lenticules, and the other side being generally flat. U.S. Pat. No. 5,757,545 issued to Wu et al. discusses the structure of a lenticular lens. Lenticular images that are typically used in conjunction with the lenticular lenses are composite images composed of several different independent images interlaced into the same space. U.S. Pat. Nos. 5,364,274 and 5,494,445 issued to Sekiguchi discuss the process of making a lenticular image.

Viewing a lenticular image through a lenticular lens, collectively known as a lenticular display, is well known in the prior art. A lenticular display allows a viewer to perceive multiple images appearing individually within the same dimensional space or plane. It is also possible for a person viewing a lenticular display to perceive a three dimensional visual effect within the same plane due to the parallax shift associated with the distance between the viewer's eyes viewing a slightly different image presented by the lenticular display.

A lenticular image is typically either imprinted directly to the back side of the lenticular lens or fixedly mounted to the back side of the lens to form the lenticular display. U.S. Pat. No. 5,710,666 issued to McDonald discloses a viewer that holds a lenticular image behind a lenticular lens. Similarly, U.S. Pat. Nos. 5,850,913 and 5,941,382 issued to Fantone et al. discloses a display box utilizing a lenticular image viewed through a lenticular lens. In order to perceive the different images presented in lenticular displays of this type, the angle at which the viewer observes the lenticular display must be changed. Thus, as the viewer's angle of observation changes, the discrete images contained within the lenticular image are seen as different images or a sequence of related images as animations or morphs. To allow a stationary viewer to perceive the different images presented in a lenticular display of this type, the lenticular display must be moved in order to achieve the necessary angle change. Alternatively, the movement of the viewer can be relied upon to change the angle of observance of a stationary lenticular display of this type. FIG. 1 illustrates a lenticular display of this typical prior art type where the lenticular image is fixedly attached to the lenticular lens. Thus, a signage display system utilizing a typical lenticular display for advertising or other such purposes, must therefor be moved if one desires to display the different lenticular images to a stationary viewer.

U.S. Pat. No. 4,118,879 issued to Simons discloses an animated display device having illuminating means in which shutter film and program film are continuously maintained in complete contact. To accomplish this, a rigid platen having a convex surface carries the shutter film is mounted within a housing disposed in facing contact with the convex surface of the platen. Tensioning springs are used to hold the shutter film against the convex platen. Drive means are provided for moving the program film relative to the platen so as to alter the alignment of the shutter film and program film to change the image projected by the device. This display device is of rather complex structure consisting of many expensive parts, is rather cumbersome to install, and is not adaptable for use with existing standard signage display systems and light box displays.

Therefore, there exists a need for an effective self-actuating lenticular display assembly that can be used with existing and standard signage display systems and light box displays. It is the primary object of this invention to fill this need.

Another objective of the claimed invention is to provide a self-actuating lenticular display that is less expensive and complex to manufacture.

Another objective of the claimed invention is to provide a self-actuating lenticular display that it relatively light and having a thin profile.

Another objective of the claimed invention is to provide a self-actuating lenticular display that provides means to reduce "soft spots" which may occur during operation of a self-actuating lenticular display.

SUMMARY OF THE INVENTION

The claimed invention is directed to providing a solution to the problem of complex lenticular display devices that are expensive to manufacture and are not adaptable to existing standard signage display systems and light box displays, as well as other problems associated with the effective presentation of lenticular displays.

The claimed invention provides a self-actuating lenticular display assembly that places the lenticular image in intimate contact with the lenticular lens while maintaining the lenticular image separate from the lenticular lens to form the lenticular display. Since the lenticular image is separate from that of the lenticular lens, the position of either the lenticular image or the lenticular lens can be moved while the other can remain stationary. The lenticular display assembly utilizes the independent nature of the lenticular image by moving a smaller lenticular image in a parallel plane to that of the lenticular lens while allowing an existing standard signage display system to hold the lenticular lens in a stationary position. This independent relationship forms an effective lenticular display capable of displaying the different images of a lenticular image that can be used in an existing stationary signage display system or display light box. With the lenticular lens remaining stationary, and the lenticular image moving in a parallel plane behind the lenticular lens inside the signage display system or display light box, the lenticular display appears to remain stationary to the viewer while the displayed images change.

The lenticular display assembly further comprises a rigid back plate placed behind the lenticular display so that the lenticular image moves in a parallel plane between the lenticular lens and the rigid back plate. The rigid back plate is smaller than the lenticular lens so that the outer profile of the lenticular display assembly has a thickness equal to the thickness of the lenticular lens. The rigid back plate is preferably made of a transparent material when the lenticular display assembly is constructed to be used in a light box display that provides light from behind the lenticular display assembly. The rigid back plate can however be made of many other types of non-transparent material if the lenticular display assembly is anticipated to be used in a setting that will not use back lighting, such as hanging the lenticular display assembly directly on a wall.

The resulting structure of the claimed self-actuating lenticular display assembly provides an assembly with a lightweight as well as slim profile that can be used in existing standard signage display systems with little or no modification.

To accomplish the movement of the lenticular image in relation to the lenticular lens, a motor mounted to the back plate located in proximate relation to the top or bottom center of the lenticular image is used. The motorized movement of the lenticular image behind the lenticular lens provides the self-actuating effect of the lenticular display assembly.

One critical aspect of displaying lenticular images is the physical alignment of the linear axis of the lens (or lenticules) with the linear axis of the lenticular images. Alignment and positioning between the lenticular image and lenticular lens must be maintained for a viewer to observe the multiple images as the lenticular image moves in a direction perpendicular to the linear axis of lenticular lens. The claimed invention maintains this critical relationship by employing alignment mechanisms that allow the lenticular image to be incrementally adjusted in relation to the lenticular lens.

Another important aspect pertaining to employing a lenticular image separate from the lenticular lens, is maintaining the "intimacy of the relationship" between the lenticular image and the lenticular lens. If the lenticular image is not maintained in an intimate relationship with the lenticular lens, "soft spots" occur in the displayed image. A "soft spot" describes the blurred lenticular display or portion of the lenticular display that is produced when the intimacy of the relationship is not maintained and the image resides outside of the focal length of the lens. The "soft spot" is an undesirable condition that detracts from the presentation of an effective lenticular display. The claimed invention claims different means for maintaining intimacy between the lenticular image and the lenticular lens, thus eliminating undesirable "soft spots" that may occur.

The preferred embodiment of the claimed invention shown in FIG. 2 is directed to a signage display system utilizing the claimed lenticular display assembly with the means for maintaining the intimacy of the relationship comprising a sealed bladder that is formed by attaching a flexible material such as thin plastic sheeting to the rigid back plate. The sealed bladder is inflated with air by way of a hose connected to a motorized pump mounted to the back side of the back plate that pushes the lenticular image toward the lenticular lens. As the sealed bladder inflates, it pushes against the back side of the lenticular image. Due to the lenticular image being printed on a pliable medium such as paper, the sealed bladder pushes the lenticular image toward the lenticular lens as the rigid back plate resists deflection. The internal pressure of the sealed bladder can then be increased or decreased to control the intimacy of relationship between the lenticular image and the lenticular lens.

Another embodiment of the claimed invention shown in FIG. 4 is directed to a signage display system utilizing the claimed lenticular display assembly with the means for maintaining the intimacy of the relationship comprising a sealed chamber between the lenticular lens and the rigid back plate. A motorized pump by way of a hose evacuates the sealed chamber to form a vacuum within the sealed chamber. The vacuum pulls the lenticular lens and lenticular image toward the rigid back plate. As the sealed chamber is evacuated, the lenticular lens and the lenticular image are drawn together to attain the desired intimacy between the lenticular image and the lenticular lens. The evacuation rate can be altered to vary the intimacy of the relationship between the lenticular lens and the lenticular image.

Yet another embodiment of the claimed invention shown in FIG. 3 is directed to a signage display system that utilizes the claimed lenticular display assembly with the means for maintaining the intimacy of the relationship comprising utilizing the sealed chamber concept to deflect the lenticular lens toward the lenticular image. This embodiment forms a sealed chamber between the lenticular lens and a rigid protective glass or cover that protects the lenticular lens. The sealed chamber is pressurized with air by way of a hose connected to a motorized pump mounted to the back side of the rigid back plate. As the sealed chamber pressurizes, the lenticular lens deflects toward the lenticular image to attain the desired intimacy between the lenticular image and the lenticular lens.

Other advantages and aspects of the present invention will become apparent upon reading the following detailed description of the invention.

DETAILED DESCRIPTION OF THE PREFERRED EMBODIMENT

Figure 1:
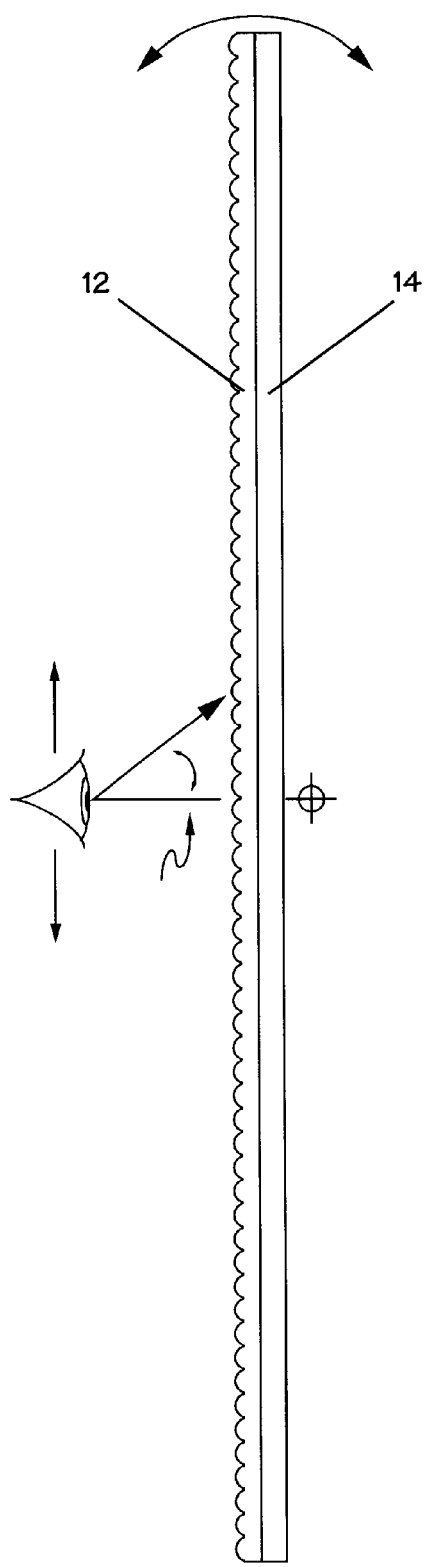
FIG. 1 Illustrates a prior art lenticular display with a lenticular image fixedly mounted to a lenticular lens.

While this invention is susceptible of embodiments in may different forms, there is shown in the drawings and will herein be described in detail a preferred embodiment of the invention. The present disclosure is to be considered as an exemplification of the principles of the invention and is not intended to limit the broad aspect of the invention to the embodiment illustrated.

FIGS. 2 through 11 show a preferred embodiment of the lenticular display assembly 10 that provides a self-actuating lenticular display capable of being used with existing signage display systems that typically implement graphic images having a thickness of up to 0.25 inches at the graphic image's perimeter.

Figure 2:
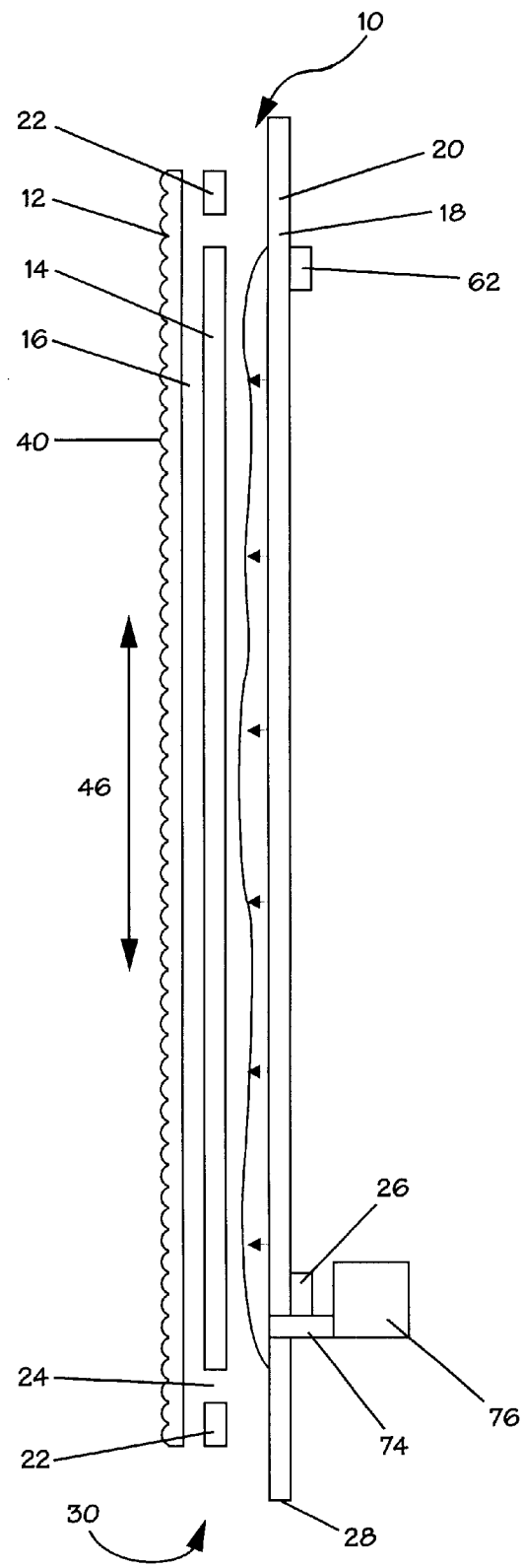
FIG. 2 Illustrates a side view of a preferred embodiment of the lenticular display assembly with an inflated sealed bladder.

FIGS. 2 through 5 shows the lenticular display assembly 10 comprises a lenticular lens plate 12, a lenticular image plate 14, means for maintaining the intimacy of the relationship 16 between the lenticular image plate 14 and the lenticular lens plate 12, and a rigid back plate 18. The lenticular image plate 14 is smaller than the lenticular lens plate 12 and is enclosed between the lenticular lens plate 12 and the rigid back plate 18. The rigid back plate 18 is slightly larger than the lenticular image plate 14 and slightly smaller than the lenticular lens plate 12 so that there is an area 20 around the perimeter of the rigid back plate 18 where foam rubber stripping 22 can be attached by adhesive or other similar means as seen in FIG. 2. The foam rubber stripping 22, or other structure capable of maintaining a relatively tight seal, forms a sealed chamber 24 where the lenticular image plate 14 can move in a parallel plane with the lenticular lens plate 12 and the rigid back plate 18. The foam rubber stripping 22 is attached to the lenticular lens by an adhesive, or other means of attaching such material that will maintain a relatively tight seal. A sealant, such as silicon sealant, is used at the joints to help attain the relatively tight seal of the sealed chamber 24.

Figure 7:
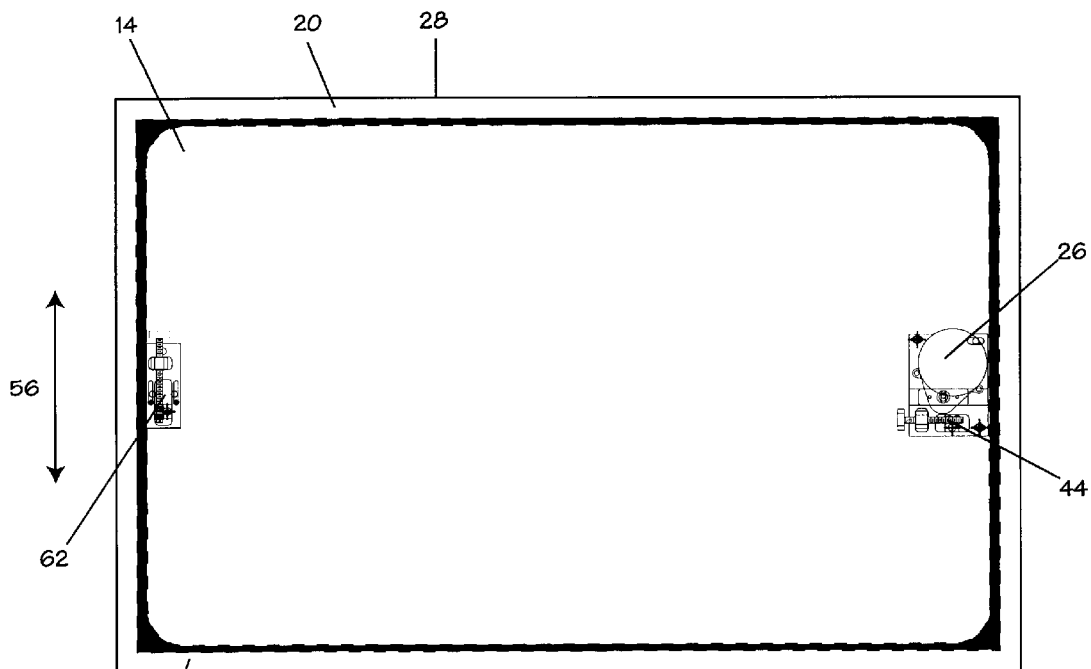
FIG. 7 Illustrates a back view of a preferred embodiment of the lenticular display assembly.
Figure 6:
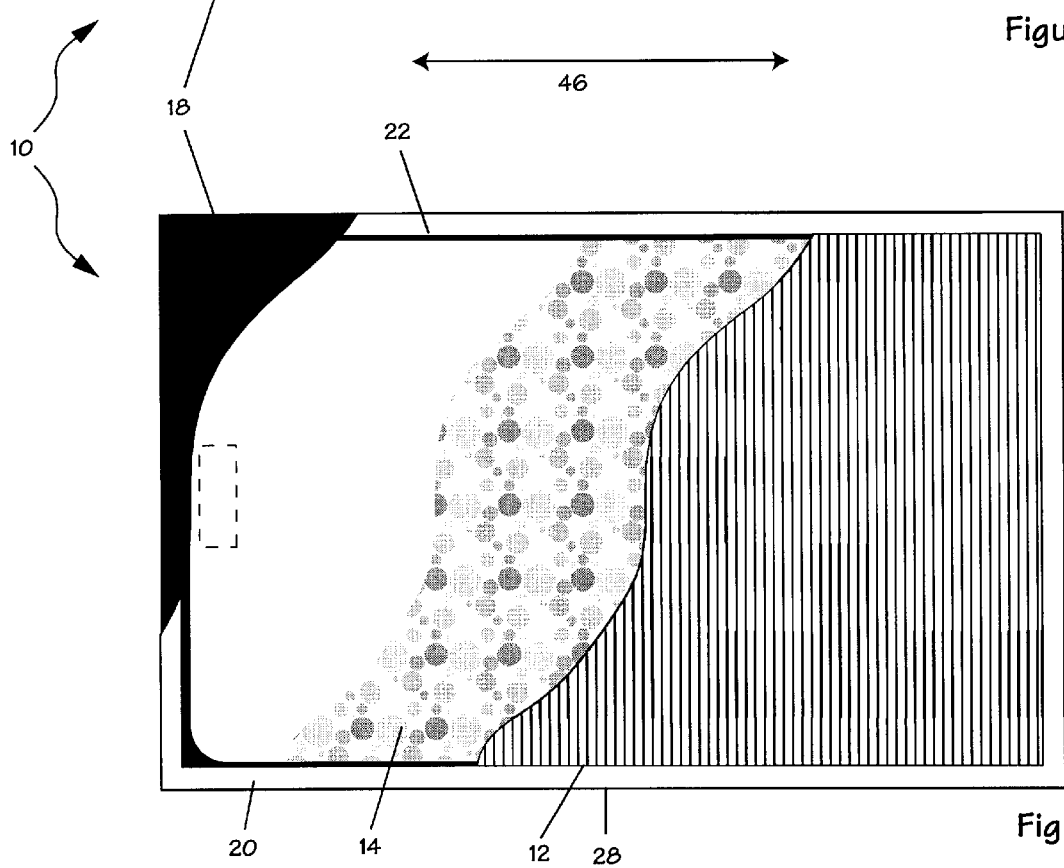
FIG. 6 Illustrates a front view of a preferred embodiment of the lenticular display assembly.
Figure 11:
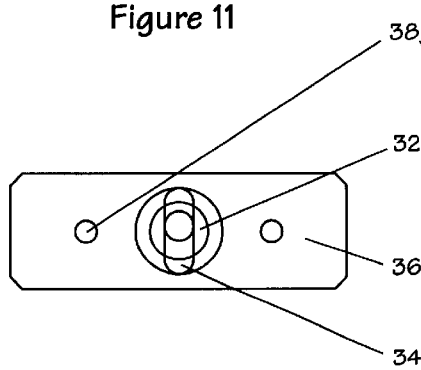
FIG. 11 Illustrates the slider, off-center cam, and drive pin.
Figure 8:
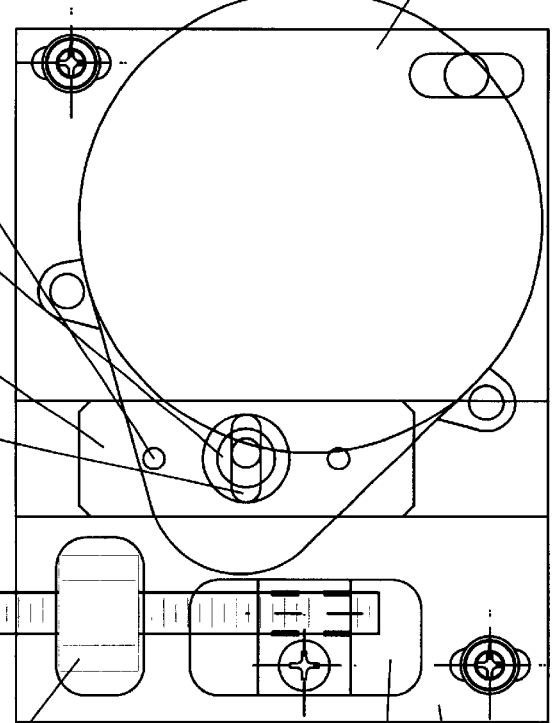
FIG. 8 Illustrates a side view of a preferred embodiment of the first alignment means integrated with the moving means.
Figure 9:
FIG. 9 Illustrates a top view of a preferred embodiment of the first alignment means integrated with the moving means.

Means for moving 26 the lenticular image plate 14 are placed away from the perimeter 28 of the lenticular display assembly 10 so as not to interfere with the installation of the lenticular display assembly 10 into existing signage display systems. The object is to minimize the thickness 30 of the lenticular display assembly 10 so that the lenticular display assembly 10 can be incorporated as any other "graphic image" and thereby fit into existing signage display systems. The means for movement 26 must be compact and not obstruct the backlight capability of the image. FIGS. 7–9 show the preferred embodiment.

Preferably, the moving means 26 comprises an adjustable, off-center cam 32 residing within an elliptical opening 34 of a slider plate 36, the slider plate 36 having a drive pin 38. The off-center cam 32 translates the rotational travel force of the moving means 26, preferably a continuous or step motor, to the desired linear movement. The distance of travel necessary to display all the images is the width of one lenticule 40. The off-center cam 32 is designed to be adaptable to and cooperate with the specific dimensions of the lenticular lens plate 12 used. Thus the off-center cam 32 is capable of being changed depending upon the physical characteristics of the lenticular lens plate 12, i.e., the width of lenticule 40. The moving means 26, as shown in FIG. 8 is integrated with an adjustment plate 42 that includes a first alignment means 44, that confine the motion of the lenticular image plate 14 to the desired range.

Critical to the quality of the lenticular display presented, the lenticular display assembly 10 must ensure proper alignment of the lenticular lens plate 12 and the lenticular image plate 14 to perfect the presentation of the "first" and "last" image seen from a "head on" view. The first alignment means 44 is capable of adjusting the alignment of the moving means 26 along the axis of motion 46. See FIGS. 7 and 8.

A preferred embodiment of the first alignment means 44 is shown in FIG. 8. An adjustment housing 48 rides against a motor mounting plate 50. The slider plate 36 is adapted to the motor mounting plate 50 wherein the off-center cam 32 cooperates with the slider plate 36 and the drive pin 38 for motion of the lenticular image plate 14 along the axis of motion 46. The motor mounting plate 50 is attached to the rigid back plate 18.

Figure 10:
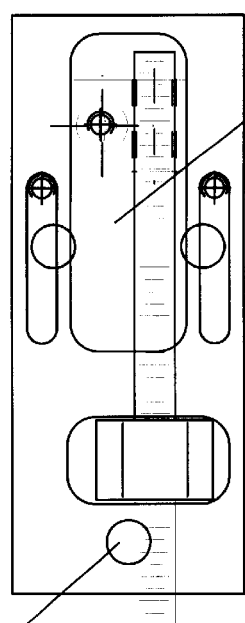
FIG. 10 Illustrates a side view of a preferred embodiment of the second alignment means.

In addition, the lenticular lens plate 12 and lenticular image plate 14 must be alignable along the axis 56 perpendicular to the motion of the lenticular image plate 14. A second alignment means 58, preferably similar to the first alignment means 44 shown in FIG. 10, adjusts the lenticular image plate 14 in relation to the lenticular lens plate 12. In one configuration, a second alignment means 58 is located on the motor mounting plate 50 with the drive pin 38 (FIG. 8). In a second configuration, the second alignment means 58, i.e., pin 60 is on a separate plate assembly 62 (FIG. 10).

FIG. 9 shows the drive pin 38 and alignment pin 60 protrude through the rigid back plate 18 of the chamber 24 so that the lenticular image plate 14 is mounted via the drive pin 38 and alignment pin 60. The lenticular image plate 14 has a hole and grommet 64 that receives the drive pin. Similarly, the lenticular image plate 14 has alignment slot 66 that receive the grommet 68 and alignment pin 60. The alignment slot 66 restricts movement of the lenticular image plate 14 in a direction substantially parallel to the direction of the alignment slot 66. The adjustment of the alignment pin 60 is in a direction substantially perpendicular to the direction of the alignment slot 66.

An important aspect of the self-actuating lenticular display assembly 10 is maintaining the "intimacy of the relationship" between the lenticular image plate 14 and the lenticular lens plate 12. If the lenticular image plate 14 is not maintained in an intimate relationship with the lenticular lens plate 12, "soft spots" 70 occur in the displayed image. A "soft spot" 70 describes the blurred lenticular display or portion of the lenticular display that is produced when the intimacy of the relationship 16 is not maintained and the image resides outside of the focal length of the lens. The "soft spot" 70 is an undesirable condition that detracts from the presentation of an effective lenticular display.

Means for maintaining the intimacy of the relationship 16 of the lenticular lens plate 12 with the lenticular image plate 14 is provided to prevent soft spots from occurring. The object is to maintain the lenticular image plate 14 and the lenticular lens plate 12 together so that the intimacy of the relationship 16 is maintained. See FIGS. 2–4.

Figure 5:
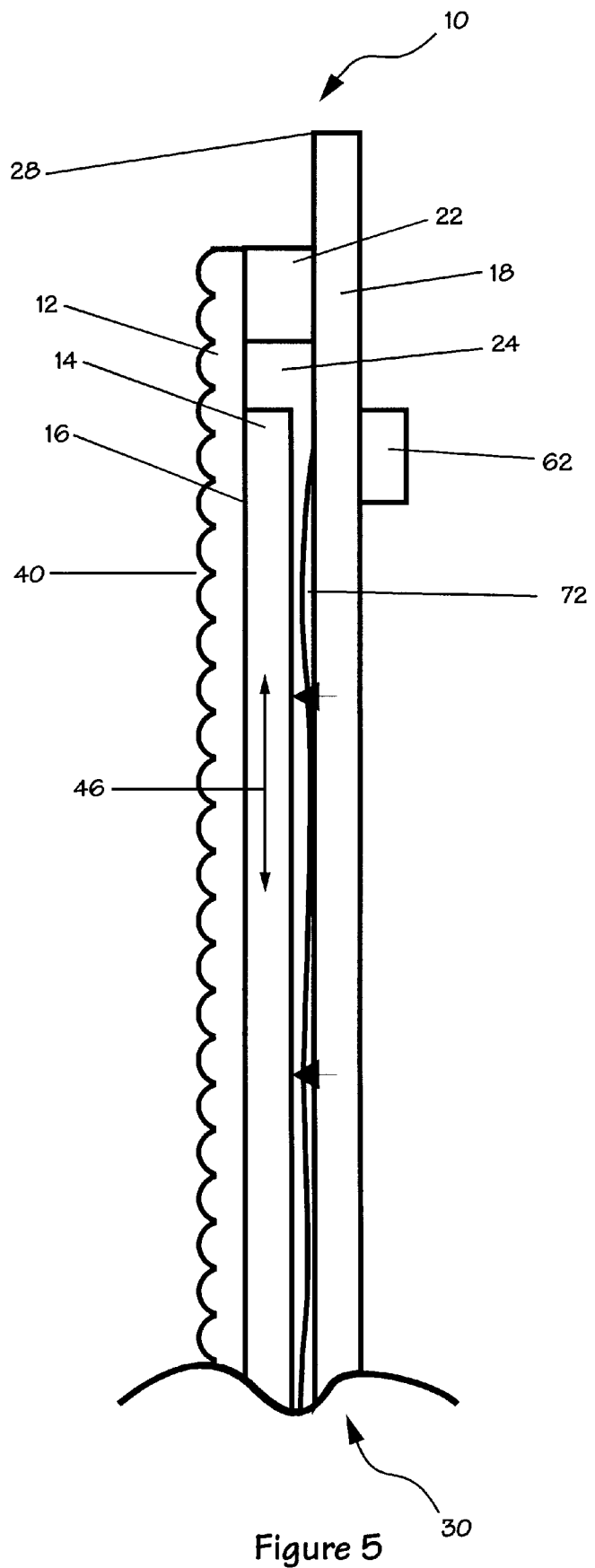
FIG. 5 Illustrates a side view a preferred embodiment of the lenticular display assembly with an inflated sealed bladder.

Preferably, the means for maintaining the intimacy of the relationship 16 comprises a inflated sealed bladder 72 made of flexible material such as thin plastic sheeting attached to the rigid back plate 18 by adhesive or other means that will maintain a relatively tight seal between the flexible material and the rigid back plate 18 as shown if FIGS. 2 and 5. The flexible material must be transparent when the lenticular display assembly 10 is constructed to be used in a light box display that provides light from behind the lenticular display assembly 10. The sealed bladder 72 can however be made of non-transparent material if the lenticular display assembly 10 is constructed to be used in an application that will not utilize back lighting. The sealed bladder 72 is inflated by way of a hose 74 connected to a motorized air pump 76 that pumps air through the hose 74 and into the sealed bladder 72. The motorized air pump 76 can be mounted to the back of the rigid back plate 18, or the motorized air pump 76 may be placed in a remote location from the lenticular display assembly 10.

Due to the flexibility of the sealed bladder material, the pressure that is produced within the sealed bladder 72 expands the sealed bladder 72 into the chamber 24. The rigid back plate 18 maintains the original size and volume of the chamber 24 so that as the sealed bladder 72 inflates, the volume within the chamber 24 decreases. Accordingly, as the sealed bladder 72 inflates, it pushes the lenticular image plate 14 toward the lenticular lens plate 12 to attain the desired intimacy of the relationship 16. The internal pressure of the sealed bladder 72 can be altered to control the intimacy of the relationship 16 between the lenticular image plate 14 and the lenticular lens plate 12 thereby effectively eliminating any soft spots 70 that may occur. The amount of pressure is critical to the operation of the lenticular display assembly 10, as too little pressure will not prevent soft spots 70 from forming, and too much pressure will prevent the lenticular image plate 14 from moving in intimate relationship with the lenticular lens plate 12. Typically, less than 3 p.s.i. are required to maintain the intimacy of the relationship 16 between a lenticular lens plate 12 measuring 48"× 36" and a lenticular image plate 14 that measures 45"×33".

The clearance area 78 between the holes and the drive pin 38 and alignment pin 60 that protrude through the holes are sealed by placing adhesive tape around the drive pin 38 and the alignment pin 60. Rubber O-rings or other like structures can also be used around the drive pin 38 and alignment pin 60 to maintain the seal.

Figure 3:
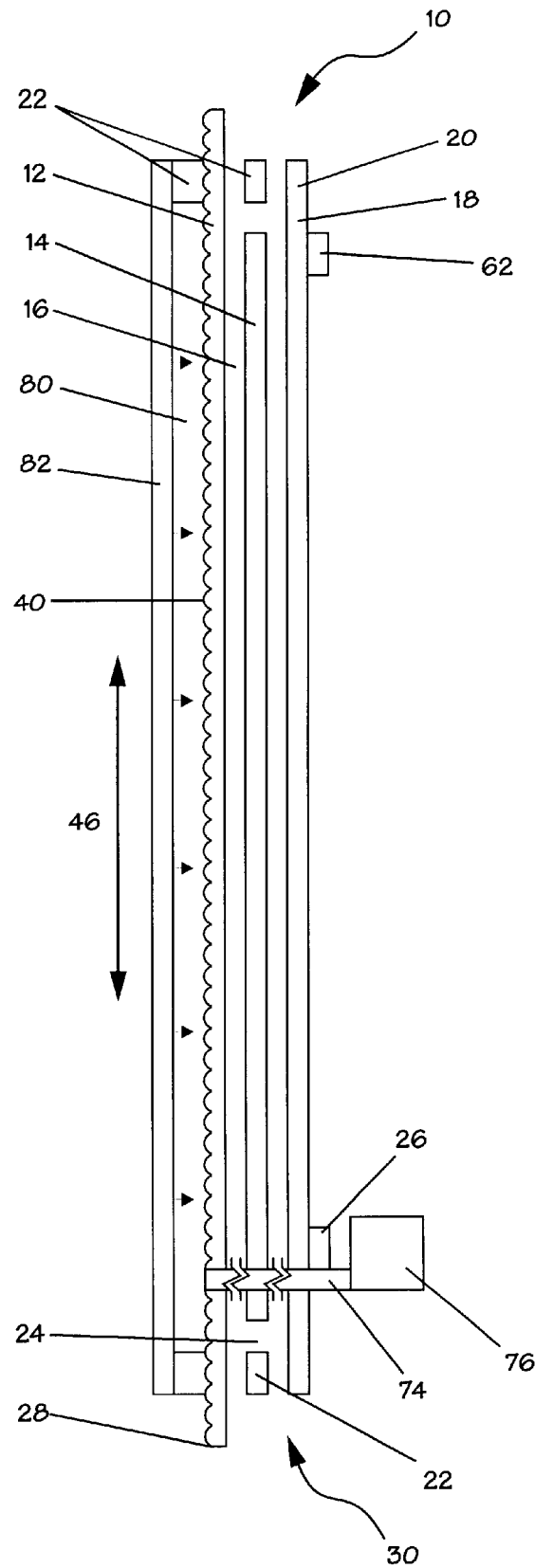
FIG. 3 Illustrates a side view of the lenticular display assembly with a second sealed chamber.
Figure 4:
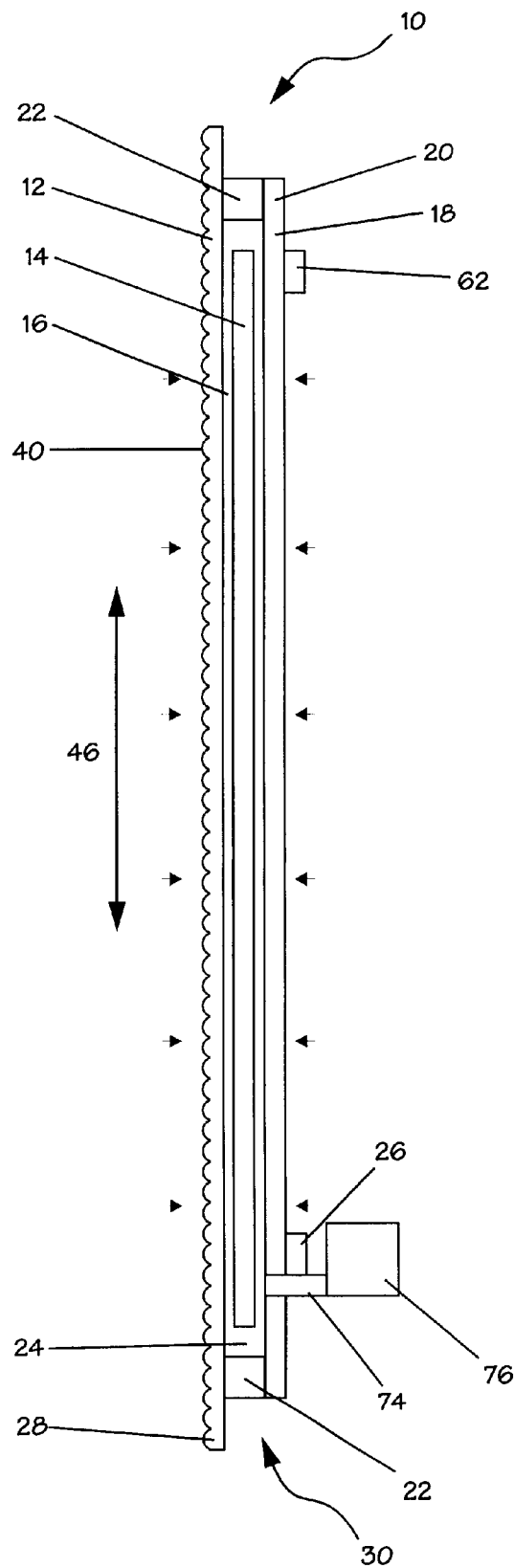
FIG. 4 Illustrates a side view of the lenticular display assembly utilizing a sealed chamber.

Alternatively, the means for maintaining the intimacy of the relationship 16 comprises using the sealed chamber concept to deflect the lenticular lens plate 12 toward the lenticular image plate 14. A second sealed chamber 80 is formed between the lenticular lens plate 12 and a rigid protective cover 82 that may be employed to protect the lenticular lens plate 12 as shown in FIG. 3. Foam rubber stripping 22, or other structure capable of maintaining a relatively tight seal, is adhered to the rigid protective cover 82, and is in turn adhered to the outside of the lenticular lens plate 12. A sealant, such as silicon sealant, is used to help attain the relatively tight seal within the second sealed chamber 80.

The second sealed chamber 80 is pressurized by way of a hose 74 connected to a motorized air pump 76 that pumps air through the hose 74 and into the second sealed chamber 80. As the second sealed chamber 80 pressurizes, the lenticular lens plate 12 deflects toward the lenticular image plate 14 as the rigid protective cover 82 resists deflection. The deflection of the lenticular lens plate 12 toward the lenticular image plate 14 attains the intimacy of the relationship 16 that is necessary to eliminate soft spots 70 and provide an effective lenticular display.

This embodiment of the means for maintaining the intimacy of the relationship 16 does not require sealing of the clearance area 78 between the holes in the rigid back plate 18 and the drive pin 38 and alignment pin 60 that protrude through the holes due to the second sealed chamber 80 being located on the opposite side of the lenticular lens plate 12. The overall thickness 30 of the lenticular display assembly 10 is increased due to the second sealed chamber 80, however, the rigid protective cover 82 can be sized such that it does not interfere with the intended goal of providing a lenticular display assembly 10 that is capable of being used in an existing signage display system or light box display.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

I claim:

1. An improved self-actuating lenticular display device adapted for insertion into an existing visual display system, the improved device comprising:

a lenticular lens plate comprising a plurality of lenticular lenses;

a back plate attached to the lenticular lens plate;

a lenticular image plate, the lenticular image plate being positioned between the lenticular lens plate and the back plate, the lenticular image plate having a perimeter with grommets positioned within the perimeter of the lenticular image plate;

a motor for moving the lenticular image plate, the motor fixedly attached to the back plate and cooperatively attached to the grommets of the lenticular image plate; and at least one aligning assembly that aligns the lenticular image plate with the lenticular lens plate, the aligning assembly being fixedly attached to the back plate.

2. The improved self-actuating lenticular display device of claim 1 further comprising an inflatable sealed bladder located between the lenticular image plate and the back plate and a pump, the pump inflating the inflatable sealed bladder so that soft spots are eliminated from the lenticular display by maintaining the intimacy between the lenticular lens plate and the lenticular image plate.

3. The improved self-actuating lenticular display device of claim 1 further comprising an evacuated chamber between the lenticular lens and the back plate so that the vacuum in the evacuated chamber eliminates soft spots from the lenticular display by maintaining intimacy between lenticular lens plate and the lenticular image plate.

4. The improved self-actuating lenticular display device of claim 1 further comprising a protective plate adjacent the lenticular lens plate, opposite the lenticular image plate, and a pressurized chamber between the protective plate and the lenticular lens plate so that the pressure of the pressurized chamber eliminates soft spots from the lenticular display by deflecting the lenticular lens plate toward the lenticular image plate maintaining intimacy between lenticular lens plate and the lenticular image plate.

5. The improved self-actuating lenticular display device of claim 1 having one aligning assembly that aligns the lenticular image plate with the lenticular lens plate vertically, and a second aligning assembly that aligns the lenticular image plate with the lenticular lens plate horizontally.

6. An improved self-actuating lenticular display device adapted for insertion into an existing visual display system, the improved device comprising:

a lenticular lens plate comprising a plurality of lenticular lenses;

a back plate attached to the lenticular lens plate, the back plate being smaller in size than the lenticular lens plate;

a lenticular image plate, the lenticular image plate being smaller in size than the back plate and positioned between the lenticular lens plate and the back plate, the lenticular image plate having a perimeter with grommets positioned within the perimeter of the lenticular image plate;

a motor for moving the lenticular image plate, the motor cooperatively attached to the grommets of the lenticular image plate;

at least one aligning assembly that aligns the lenticular image plate with the lenticular lens plate, the aligning assembly being fixedly attached to the back plate;

an inflatable sealed bladder located between the lenticular image plate and the back plate; and a pump, the pump inflating the inflatable sealed bladder so that soft spots are eliminated by maintaining the intimacy between the lenticular image plate and the lenticular lens plate.

7. The improved self-actuating lenticular display device of claim 6 wherein the motor drives the pump and is fixedly attached to the back plate.

8. The improved self-actuating lenticular display device of claim 7 having one aligning assembly that aligns the lenticular image plate with the lenticular lens plate vertically, and a second aligning assembly that aligns the lenticular image plate with the lenticular lens plate horizontally.

9. The improved self-actuating lenticular display device of claim 8 wherein the inflatable sealed bladder is formed by attaching flexible plastic material to the back plate, between the lenticular image plate and the back plate.

10. The improved self-actuating lenticular display device of claim 9 wherein the inflatable sealed bladder is inflated to a pressure of less than 3 p.s.i.

11. An improved self-actuating lenticular display device adapted for insertion into an existing visual display system, the improved device comprising:

a lenticular lens plate comprising a plurality of lenticular lenses;

a back plate, the back plate being smaller in size than the lenticular lens plate;

means for attaching the back plate and the lenticular lens plate;

a lenticular image plate, the lenticular image plate being smaller in size than the back plate and positioned between the lenticular lens plate and the back plate, the lenticular image plate having a perimeter with means for engaging positioned within the perimeter of the lenticular image plate;

means for moving the lenticular image plate, the means for moving the lenticular image plate being fixedly attached to the back plate and cooperatively attached to the means for engaging of the lenticular image plate; and means for aligning the lenticular image plate with the lenticular lens plate, the means for aligning being fixedly attached to the back plate.

12. The improved self-actuating lenticular display device of claim 11 further comprising means for maintaining the lenticular image plate in intimate relationship with the lenticular lens plate thereby eliminating soft spots from the lenticular display.

13. The improved self-actuating lenticular display device of claim 12 wherein the means for maintaining the lenticular image plate in intimate relationship with the lenticular lens plate comprises an inflatable sealed bladder located between the lenticular image plate and the back plate and a pump, the pump inflating the inflatable sealed bladder so that soft spots are eliminated from the lenticular display by maintaining intimacy between the lenticular lens plate and the lenticular image plate.

14. The improved self-actuating lenticular display device of claim 12 wherein the means for maintaining the lenticular image plate in intimate relationship with the lenticular lens plate comprises an evacuated chamber between the lenticular lens and the back plate so that the vacuum in the evacuated chamber eliminates soft spots from the lenticular display by maintaining intimacy between lenticular lens plate and the lenticular image plate.

15. The improved self-actuating lenticular display device of claim 12 further comprises a protective plate adjacent the lenticular lens plate, opposite the lenticular image plate, and the means for maintaining the lenticular image plate in intimate relationship with the lenticular lens plate comprises a pressurized chamber between the protective plate and the lenticular lens plate so that the pressure of the pressurized chamber eliminates soft spots by deflecting the lenticular lens plate toward the lenticular image plate maintaining intimacy between lenticular lens plate and the lenticular image plate.

16. The improved self-actuating lenticular display device of claim 11 wherein the means for moving the lenticular image plate is a motor.

17. The improved self-actuating lenticular display device of claim 16 wherein the means for aligning the lenticular image plate with the lenticular lens plate comprises at least one aligning assembly that aligns the lenticular image plate with the lenticular lens plate.

18. The improved self-actuating lenticular display device of claim 17 wherein the means for engaging positioned within the perimeter of the lenticular image plate comprises at least one grommet.

* * * * *